United States Patent
Sudano (10) Patent No.: US 11,607,899 B2
(45) Date of Patent: Mar. 21, 2023

(54) DIRECT PRINTING ONTO EXTRUDED PVC SLATS

(71) Applicant: PLASTIBEC INC., Quebec (CA)

(72) Inventor: Angelo Sudano, Quebec (CA)

(73) Assignee: PLASTIBEC INC., Quebec (CA)

(*) Notice: Subject to any disclaimer, the term of this patent is extended or adjusted under 35 U.S.C. 154(b) by 153 days.

(21) Appl. No.: 16/928,085

(22) Filed: Jul. 14, 2020

(65) Prior Publication Data

US 2021/0114391 A1    Apr. 22, 2021

(51) Int. Cl.
| | |
|---|---|
| *B41M 1/30* | (2006.01) |
| *B41M 1/10* | (2006.01) |
| *B41M 7/00* | (2006.01) |
| *B29C 48/00* | (2019.01) |
| *B41F 13/22* | (2006.01) |
| *B29K 27/06* | (2006.01) |

(52) U.S. Cl.
CPC .......... *B41M 1/30* (2013.01); *B29C 48/0023* (2019.02); *B41F 13/22* (2013.01); *B41M 1/10* (2013.01); *B41M 7/009* (2013.01); *B29C 2795/007* (2013.01); *B29K 2027/06* (2013.01)

(58) Field of Classification Search
CPC .......... B29C 48/0023; B29C 2795/007; B41M 1/30; B41F 13/22; B41F 15/28
See application file for complete search history.

(56) References Cited

U.S. PATENT DOCUMENTS

| | | | | |
|---|---|---|---|---|
| 6,668,715 | B1* | 12/2003 | Biro | B41F 19/02 101/6 |
| 6,823,794 | B2* | 11/2004 | Bosler | B41M 1/30 101/232 |
| 7,243,600 | B1* | 7/2007 | Boettcher | B41F 31/08 101/157 |
| 2001/0042345 | A1* | 11/2001 | Franco | E06B 9/386 49/92.1 |
| 2005/0206024 | A1* | 9/2005 | Jochem | B05B 7/0884 264/319 |
| 2010/0139874 | A1* | 6/2010 | Sudano | E06B 9/386 160/405 |
| 2015/0145918 | A1* | 5/2015 | Herbert | B41J 29/377 347/17 |
| 2016/0346982 | A1* | 12/2016 | Lin | B29B 13/06 |

FOREIGN PATENT DOCUMENTS

| | | | |
|---|---|---|---|
| CN | 2902711 Y | * | 5/2007 |
| JP | 2005324355 A | * | 11/2005 |

* cited by examiner

*Primary Examiner* — Jennifer Bahls
*Assistant Examiner* — Quang X Nguyen
(74) *Attorney, Agent, or Firm* — Kohn & Associates, PLLC (57) ABSTRACT

Described is a process and system for direct printing of a decorative pattern onto an extruded PVC slat. The process includes providing a hot extruded PVC slat; directly contacting a surface of the hot extruded PVC slat with a direct printing cylinder as the slat is moved in a downstream direction, where the cylinder has a pattern with a cell structure that receives ink and rotates to directly apply the ink in the form of the pattern onto the surface of the hot extruded PVC slat. The process also includes controlling a temperature of the direct printing cylinder to inhibit drying of the ink while present on the direct printing cylinder.

21 Claims, 5 Drawing Sheets

DIRECT PRINTING ONTO EXTRUDED PVC SLATS

CROSS-REFERENCE TO PRIOR APPLICATION

The present application claims priority to Canadian application No. 3,058,872 filed on Oct. 16, 2020, and which is hereby incorporated herein by reference in its entirety.

BACKGROUND OF THE INVENTION

1. Technical Field

The technical field generally relates to extruded slats, and more particularly to techniques for printing colors and patterns onto extruded slats.

2. Background Art

There are various methods for providing colors, patterns or embossments onto extruded slats. However, many of such methods are relatively complex and can require complicated equipment, such as various rollers including transfer rollers to transfer patterns or colors onto the extruded slats. There is indeed a need for technologies that overcome at least some of the disadvantages that are known in this field of making decorative slats for use as louvers in architectural openings.

SUMMARY OF THE INVENTION

The present description provides various techniques related to direct printing onto hot PVC extruded slats and the production of printed slats that are configured for use, for example, as horizontal or vertical blinds or louvers.

In some implementations, there is provided a process for direct printing of a decorative pattern onto an extruded PVC slat, comprising providing a hot extruded PVC slat; directly contacting a surface of the hot extruded PVC slat with a direct printing cylinder as the slat is moved in a downstream direction, the cylinder comprising a pattern with a cell structure that receives ink and rotates to directly apply the ink in the form of the pattern onto the surface of the hot extruded PVC slat; and controlling a temperature of the direct printing cylinder to inhibit drying of the ink while present on the direct printing cylinder.

In some implementations, the cooling of the direct printing cylinder is performed by feeding a cooling fluid into a bore within the cylinder to remove heat therefrom and producing a heated cooling fluid. In some implementations, the heated cooling fluid is withdrawn from the direct printing cylinder and is cooled in order to regenerate the cooling fluid for recirculation back into the direct printing cylinder. In some implementations, the cooling fluid is cooled to a temperature below 80° F. before cooling the direct printing cylinder. In some implementations, the cooling fluid is cooled to a temperature below 70° F. before cooling the direct printing cylinder. In some implementations, the cooling fluid is cooled to a temperature between 50° F. and 60° F. before cooling the direct printing cylinder. In some implementations, the process includes measuring a temperature of the direct printing cylinder and/or of the extruded PVC slat, and based on the measured temperature controlling the cooling of the direct printing cylinder. In some implementations, multiple direct printing cylinders are arranged in series along a first side of the extruded PVC slat in order to provide multiple direct printed patterns thereon. In some implementations, at least one additional direct printing cylinder is provided on an opposed side of the extruded PVC slat to provide a directly printed pattern onto the opposed side thereof. In some implementations, the hot extruded PVC slat is at a temperature between 300° F. and 375° F. while contacting the direct printing cylinder. In some implementations, the hot extruded PVC slat is at a temperature between 310° F. and 370° F. while contacting the direct printing cylinder. In some implementations, the hot extruded PVC slat is at a temperature between 320° F. and 365° F. while contacting the direct printing cylinder. In some implementations, the hot extruded PVC slat is at a temperature between 330° F. and 360° F. while contacting the direct printing cylinder. In some implementations, the process further includes applying the ink onto the direct printing cylinder by passing the direct printing cylinder into an ink pan and then scraping off excess ink using a doctor blade. The ink can be applied using other techniques, if desired. In some implementations, a plurality of printing stations is provided, each printing station comprises one of the direct printing cylinders that directly prints onto the hot extruded PVC slat. In some implementations, each printing station is spaced apart from an adjacent printing station to allow ink applied at the previous printing station to dry prior to the subsequent printing station. In some implementations, each printing station is at least 24 inches away from the previous printing station. In some implementations, the process further includes texturizing the printed PVC slat. In some implementations, the texturizing is performed while the printed PVC slat is at a temperature of at least 200° F. In some implementations, the texturizing is performed while the printed PVC slat is at a temperature of 200° F. to 250° F. In some implementations, after applying the ink into the PVC slat, the printed PVC slat is subjected to drying. In some implementations, the drying comprising directing air at the PVC slats. In some implementations, the air is provided via high velocity air nozzle dryers. In some implementations, the high velocity air nozzle dryers are provided within a hood. In some implementations, the hood is heated. In some implementations, the process includes curing the printed PVC slats to produce a slat product. In some implementations, the process includes cutting the slat product to produce louvers for horizontal or vertical applications.

In some implementations, there is provided a process for direct printing of a decorative pattern onto an extruded polymer slat, comprising providing a hot extruded slat; directly contacting a surface of the hot extruded slat with a direct printing cylinder as the slat is moved in a downstream direction, the cylinder comprising a pattern with a cell structure that receives ink and rotates to directly apply the ink in the form of the pattern onto the surface of the hot extruded slat; and controlling a temperature of the direct printing cylinder to inhibit drying of the ink while present on the direct printing cylinder.

In some implementations, there is provided a process for direct printing of a decorative pattern onto an extruded polymer slat, comprising providing a hot extruded slat; directly contacting a surface of the hot extruded slat with a direct printing cylinder as the slat is moved in a downstream direction, the cylinder comprising a pattern with a cell structure that receives ink and rotates to directly apply the ink in the form of the pattern onto the surface of the hot extruded slat; and subjecting the hot extruded slat to curing to cure the ink and produce a printed slat product.

In some implementations, there is provided a process for direct printing of a decorative pattern onto an extruded polymer slat, comprising providing a hot extruded slat; directly contacting a surface of the hot extruded slat with a direct printing cylinder as the slat is moved in a downstream direction, the cylinder comprising a pattern with a cell structure that receives ink and rotates to directly apply the ink in the form of the pattern onto the surface of the hot extruded slat; wherein the ink remains flowable during the direct printing onto the hot extruded slat.

In some implementations, there is provided process for direct printing of a decorative pattern onto an extruded polymer slat, comprising providing a hot extruded slat; directly contacting a surface of the hot extruded slat with a direct printing cylinder as the slat is moved in a downstream direction, the cylinder comprising a first pattern with a cell structure that receives ink and rotates to directly apply the ink in the form of the first pattern onto the surface of the hot extruded slat; and directly contacting a surface of the hot extruded slat with a direct printing cylinder as the slat is moved in a downstream direction, the cylinder comprising a second pattern with a cell structure that receives ink and rotates to directly apply the ink in the form of the second pattern onto the surface of the hot extruded slat.

In some implementations, these processes have one or more features defined above or herein.

In some implementations, there is provided slat for use as a horizontal or vertical louver, the slat being between 2 inches and 5 inches wide, 0.018 inches and 0.045 inches thick, and comprising a polyvinyl chloride (PVC) core with a printed surface that comprises cured ink provided in a decorative pattern. The slat can have one or more additional features as defined herein and can be made using processes described herein.

In some implementations, there is provided a system for direct printing of a decorative pattern onto an extruded PVC slat, comprising: a feed assembly for feeding PVC beads or other solid PVC material; an extruder having an inlet for receiving the PVC beads from the feed assembly, a main section for melting the beads, and an outlet for extruding a hot PVC slat; and a printing station comprising a frame, a direct printing cylinder mounted to the frame, an ink supply assembly containing ink and configured such that the direct printing roller receives ink therefrom for direct application to the hot PVC slat, and a cooling system coupled to the direct printing roller for removing heat from the same. The system can have additional features, such as an oven, curing station, multiple printing stations, various roller and cylinder setups, spacings between the different units, and so on, as may be further described herein.

DETAILED DESCRIPTION OF THE INVENTION

Techniques described herein relate to direct printing of colors and patterns onto an extruded slat that may be composed of polyvinyl chloride (PVC) or other similar polymeric materials. The extruded slat comes into direct contact with a direct printing cylinder, which has a pattern thereon with a cell structure for receiving ink and applying the ink directly onto one side of the extruded slat, thereby producing a printed slat. The ink formulation, the cell structure of the pattern, and process control methodologies can be provided to enable enhanced design precision of the printed pattern onto the extruded slat that is fed from the extruder toward downstream equipment.

Figure 1:
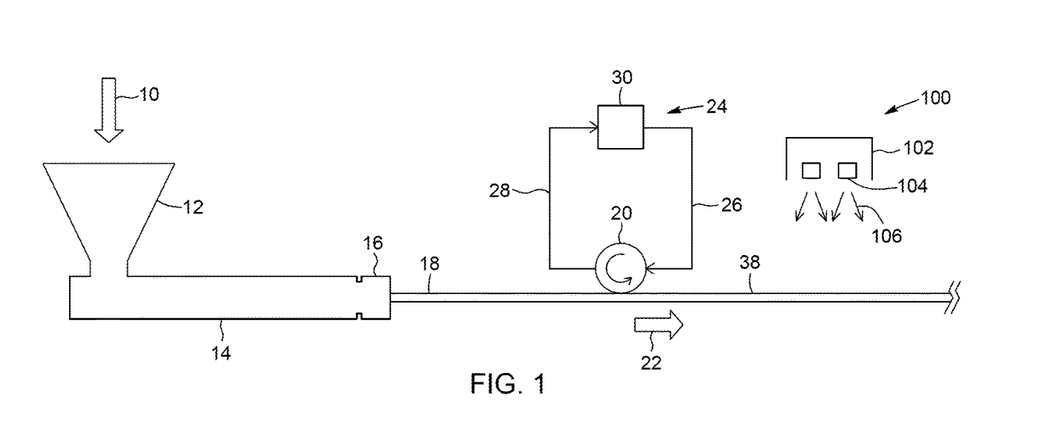
FIG. 1 is a schematic showing an extrusion arrangement.

Referring to FIG. 1, polymeric material which may be in the form of beads (10) are first supplied into a hopper (12) and then passed into an extruder (14) where the polymer is melted and forced by a screw toward the extruder's die (16). The extruder (14) therefore produces an extruded slat (18), which has the form of a continuous, elongated, thin structure that proceeds to downstream processing units. Upon exiting the extruder (14), the extruded slat (18) is relatively hot and is eventually cooled as it moved downstream along the process train.

Still referring to FIG. 1, a direct printing cylinder (20) is provided in direct contact with the extruded slat (18) while the slat is still relatively warm in order to apply a printing pattern onto the extruded slat (18). The warm slat may be at a temperature between 300° F. and 375° F., between 310° F. and 370° F., between 320° F. and 365° F., between 330° F. and 360° F., or around 355° F. plus or minus two degrees. The direct printing cylinder (20) receives ink from an ink transfer roller (not illustrated in FIG. 1) or another ink transfer device. For example, an ink reservoir can be provided and can have a doctor blade for applying the ink to the printing cylinder (20). The ink is then transferred from the direct printing cylinder (20) directly onto the extruded slat as the slat is moved in a downstream direction (22).

The direct printing cylinder has a pattern that is etched onto its surface. The pattern can be made so as to have a cell structure, which consists of small holes of certain size, shape and spacing to form the overall pattern. The cell structure of direct printing cylinder can be particularly designed for applying the ink directly onto a warm extruded polymeric slat that does not absorb the ink. The printing cylinder can be composed of metal with the desired image engraved onto the metallic surface in the form of a pattern with cavities, which may be referred to as "cells". The direct printing cylinder, which can also be called a gravure cylinder, can have a surface that varies depending on the engraving system. The surface can be made of copper protected by a final chrome finish, or other metallic compositions. The printing cylinder can rotate through an ink pan where the cells pick up ink. The excess ink on non-image areas of the printing cylinder is scraped off the cylinder by the doctor blade before the ink is transferred directly to the surface of the warm slat. The inks themselves can be based on low viscosity solvents or water. After each ink unit, the ink can be dried using high velocity air nozzle dryers (104) in hoods (102), which are heated depending on the application and ink system. The high velocity air nozzle dryers (104) expel air (106) for drying and is part of a drying stage (100), as shown in FIG. 1.

In addition, the ink can be formulated to have an appropriate viscosity and absorbing properties as well as heat resistance for the direct printing process. The printing cylinder design can also be tailored to use various types of inks with various properties. For instance, the cell structure and shape can be configured for providing a desired flow and print quality results.

In the past, patterns have been provided onto extruded polymeric slats using a transfer roller which was typically a smooth rubber roller onto which the pattern was provided by another roller that is not in direct contact with the extruded slat. However, transfer roller configurations can be relatively complicated and can cause difficulties in terms of enabling higher resolution patterns, and therefore certain patterns are not possible to be applied onto extruded slats. However, in the present case, the direct printing cylinder is provided with patterns that have appropriate cell structures, the ink is provided to be received by those cell structures and be directly printed onto the warm extruded slat to provide a relatively high precision design pattern on the extruded slat.

Referring still to FIG. 1, the direct printing cylinder (20) is preferably cooled using a cooling system (24) in order to keep the direct printing cylinder (20) at a relatively constant and reasonably cool temperature. If the direct printing cylinder is allowed to excessively increase in temperature, the ink that is being directly applied from the direct printing cylinder (20) onto the extruded slat (18) can increase in viscosity or even dry out, resulting in reduced performance and precision. In addition, since the extruded slat (18) is relatively warm upon contact with the direct printing cylinder (20), there is a tendency for the cylinder (20) to heat up over time. Therefore, the cooling system (24) enables the cylinder (20) to be kept at a relatively constant and sufficiently low temperature for the direct printing operation.

The cooling system (24) can include an inlet line (26) for providing a cooling fluid into the direct printing cylinder (20), an outlet line (28) coupled to the direct printing cylinder (20) in order to remove the heated cooling fluid from the cylinder (20), and a regenerator unit (30) that receives the heated cooling fluid (28) and cools it in order to regenerate the cooling fluid (26). Various types of cooling systems can be integrated into the printing cylinder (20). The cooling fluid can be water or another type of fluid.

Figure 2:
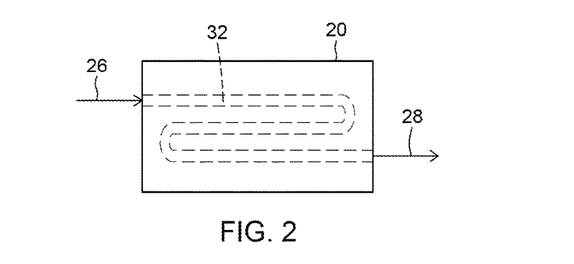
FIG. 2 is a schematic showing a printing cylinder.
Figure 3:
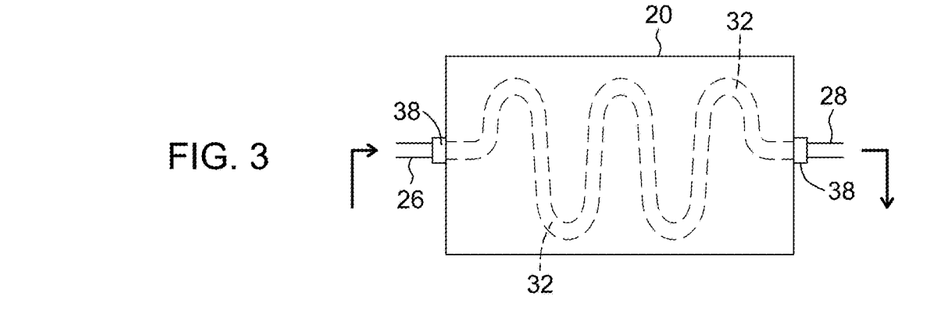
FIG. 3 is another schematic showing a printing cylinder.

Turning now to FIGS. 2 and 3, it is noted that the direct printing cylinder (20) can have an internal bore (32) that has an inlet and an outlet that are respectively coupled to the inlet and outlet lines of the cooling system (not shown here). The internal bore (32) can have various configurations, two possibilities of which are shown in FIGS. 2 and 3. It is also noted that the bore can simply pass directly through the direct printing cylinder (20) as a linear channel from the inlet to the outlet or can have various serpentine paths within the direct printing cylinder (20). Although the illustrated bores have a single continuous path from the inlet to the outlet, it is also noted that there may be a branched configuration where the bore branches off of a single inlet portion and then rejoins at the outlet.

Regarding the cooling system (24), the cooling fluid can be selected from various known heat transfer fluids and can include water, glycol, or various other fluids that are preferably liquid at the temperatures of the process. In addition, the regenerator unit (30) can be an air cooler or any other cooling unit that can essentially cool the heated cooling fluid. Water can be used as the cooling fluid, although any other coolant could also be used (e.g., anti-freeze). The regenerator unit (30) can be a "chiller" which cools down the heated water being re-circulated down to a desired lower temperature, e.g. to between 45° F. and 65° F., between 50° F. and 60° F., or to about 56° F. to 58° F. The cooling system can be configured as a closed-loop system for continuous water circulation and cooling down. Other cooling system can also be used.

It is also noted that the temperature of the water or cooling fluid as it exits the cylinder will be higher than at the entry but can vary depending on a number of factors, such as flow rate, cylinder size and design, internal cylinder design for fluid passage, cylinder wall thickness, and the like.

The cooling system can be operated such that the printing cylinder's external contact surface on which ink is provided remains below 110° F. throughout the printing process, when inks are used that would begin to dry or would experience a notable viscosity change above this temperature.

This is an example of a cylinder surface temperature threshold that is controlled below a certain value and may depend on factors such as the ink formulation.

The cooling system is nevertheless designed to avoid or limit ink drying or ink flow properties that would result in reduced printing quality.

Figures 4, 5:
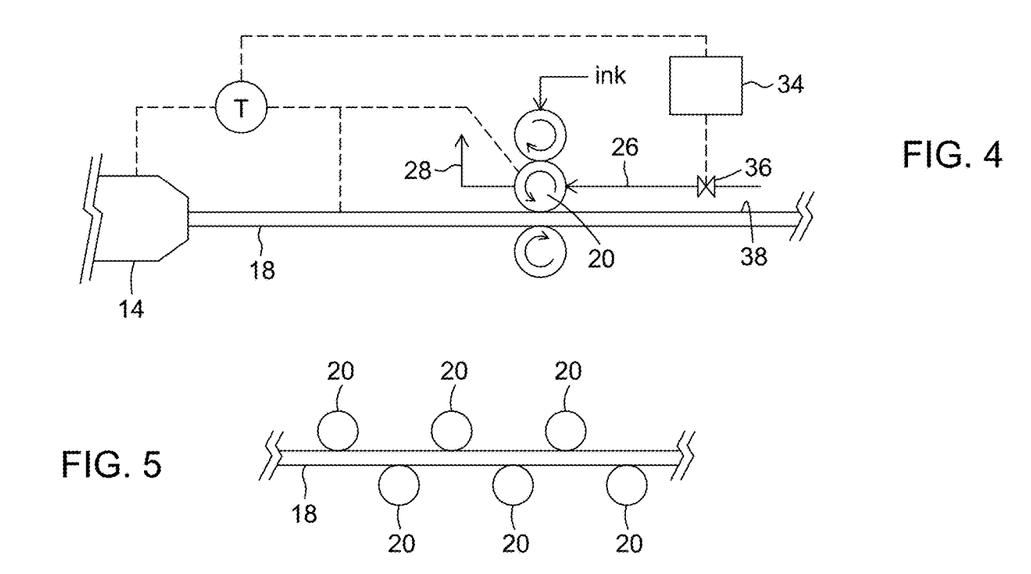
FIG. 4 is a schematic showing direct printing onto an extruded slat including a control system for controlling temperature or cooling levels of the direct printing cylinder.
FIG. 5 is a schematic showing multiple direct printing cylinders contacting an extruded slat.

Referring now to FIG. 4, a control unit (34) can be provided in order to control the cooling system (24) in response to measured temperatures. Temperatures can be monitored continuously or periodically. Temperatures can be monitored in the overall system at various points, including at the extruder (14), at the extruded slat at any point upstream of the direct printing cylinder (20), at the direct printing cylinder (20) itself, and various other points in the process. One or more temperature measurements can be provided to the control unit (34), which can be operatively coupled to the cooling system (24) in order to control one or more variables of the cooling system (24). For example, as shown in FIG. 4, the control unit (34) can be coupled to a valve (36), which controls the flow rate of the cooling fluid that is fed into the direct printing cylinder (20), thereby controlling the amount of cooling that is enabled by the cooling system (24). Alternatively, the temperature of the cooling fluid can be controlled, or another variable could be controlled in order to regulate the cooling system (24). Temperature control can enhance the process since elevated temperatures can result in drying of the ink, while excessively cool temperatures can result in an undesirable increase in viscosity of the ink. For example, the temperature can be kept below 110° F. to ensure the inks do not dry out or experience significant viscosity changes that would inhibit flow. Of course, if different inks are used then the temperature could be kept at a different maximum threshold.

Turning back to FIGS. 2 and 3, preferably the inlet and outlet lines (26), (28) of the cooling system are coupled to the direct printing cylinder (20) to facilitate easy rotation and the mounting of the cooling system (24) to the cylinder (20). For example, the lines can be coupled along a central rotational axis of the cylinder (20) and rotating coupling units (38) can be provided at the connection points. The connection can be provided by quick-connects, although other mounting techniques could also be used.

After the printing, the printed slat can be subjected to a drying or curing stage in order to increase the permanence of the printed pattern. This stage can be performed by passing the printed slat through an oven. Without curing, certain inks can "rub-off" if pressure is applied or when rubbing two slats against one another, and the ink could also "wash-off" when cleaned with house-hold liquid cleaner. Thus, the curing process increases the permanence of the ink pattern and reduces undesired removal of the ink from the slat after production.

Thus, the process described herein is able to produce a direct-printed extruded slat (38) to have a decorative pattern, and the slat can then be subjected to additional treatments, such as general cooling, cutting and the like in order to produce extrusion products that can be sold to the market. Extrusion products can include louvers for window coverings, moldings, and other elongated architectural objects. It is also noted that additional treatments can be performed in combination with the printing and can be done before or after the printing stage or stages. For example, the slat can be subjected to colouring, embossing or texturizing or a combination thereof.

In addition, multiple direct printing cylinders can be provided in order to directly apply a more complex design onto a same side of the extruded slat and/or onto both opposed sides of the extruded slat. Thus, multiple direct printing cylinders (20) can be arranged in series along the extruded slat. Multiple cylinders can be used to provide different colours, different parts of an overall pattern or decoration, and so on. FIG. 5 illustrates an example where there are three direct printing rollers (20) that are arranged in series on either side of the extruded slat (18).

It should be noted that a cooling system (24) can be arranged such that there is a single main cooling fluid line that branches off into distinct cooling lines that go to respective direct printing cylinders and then the corresponding return lines join together again to return back into a common regenerator unit (30). Alternatively, each direct printing cylinder (20) can have its own individual cooling system (24) or sub-groups of cylinders can have respective common cooling systems (30). It is also noted that the direct printing cylinders that are provided on opposed sides of the extruded slat (18) can be arranged in various manners, such as the staggered arrangement as illustrated in FIG. 5, or in various other arrangements such as vertically aligned arrangement or others. In addition, the same or different patterns can be applied to either side of the extruded slat. It is also noted that alternative treatments can be applied on different sides of the slat, such as embossing, coloring, printing, and so on, using other rollers and cylinders arranged along the process train.

Still referring to FIG. 5, it is noted that it may be desirable to provide a certain longitudinal spacing between adjacent direct printing cylinders (20) to allow the ink applied from an upstream cylinder sufficient time to dry onto the extruded slat before the slat reaches the subsequent direct printing cylinder. In one example configuration, about 24 inches is provided in between each printing station. The spacing is provided to allow for the ink provided in one station to dry sufficiently in order to avoid ink bleeding issues. In addition, texture can be added to the slat after printing is completed, and in this case a minimum slat temperature can be provided to ensure adequate texturizing can be achieved. Such a minimum slat temperature can be about 200° F., for example, and thus the last printing station and the texturizing station can be spaced accordingly. It is noted that the direct printing can also be combined with other treatments, such as embossing, coloring, and others that can be performed before or after the printing treatment to provide a desired effect.

Tests were conducted to assess the direct printing process on vinyl slats. Various ink compositions were assessed along with cell structures for the printing cylinder, and an elongate cell structure with almost no wall was chosen. Typically, the geometric design of the Stylus, which has an engraving Speed of about 4000 cells per second, has an angle of about 130 degrees; and this particular stylus design can provide various screen rulings from 100 up to 350 lines per inch (LPI). Other products, such as a Helio Klischograph™, not only offers a variety of screen ruling but it can facilitate high quality gravure cylinder engraving.

Figure 6:
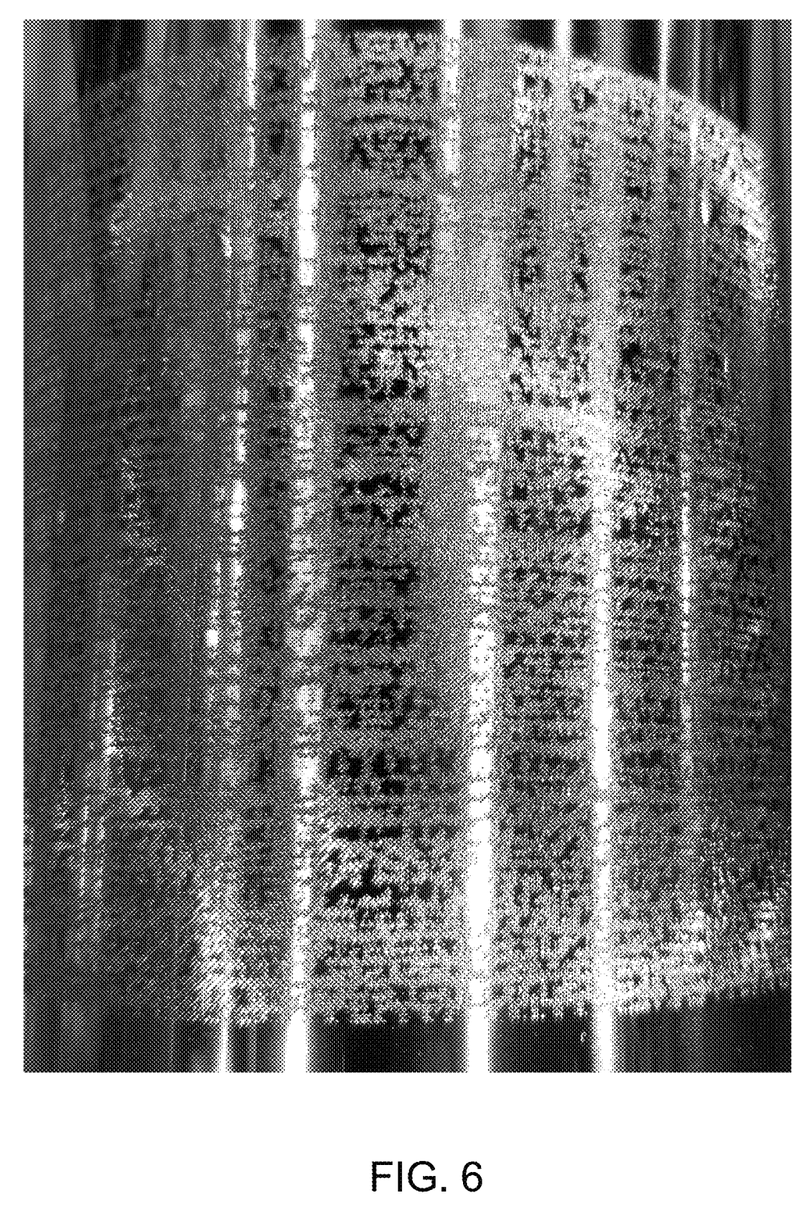
FIG. 6 is an image of part of an example direct printing cylinder.
Figure 7:
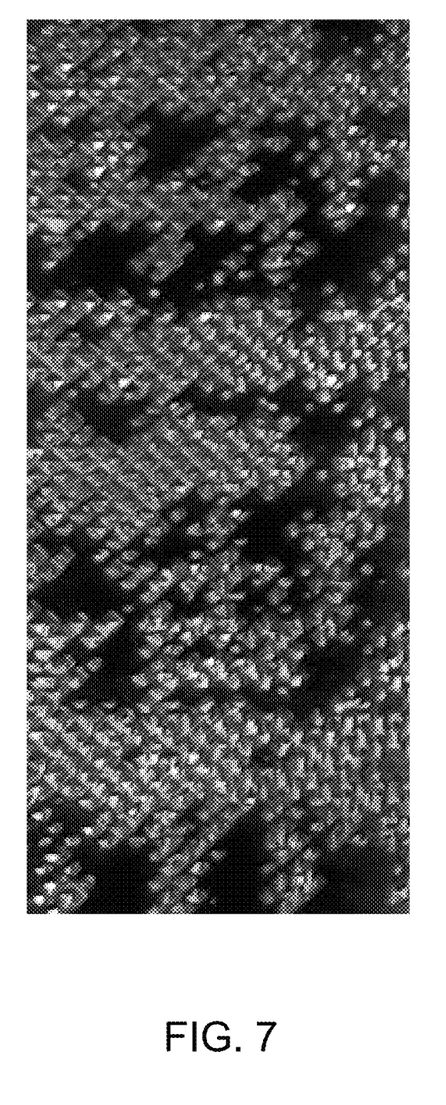
FIG. 7 is a close-up of part of FIG. 6 showing cells up close.
Figure 8:
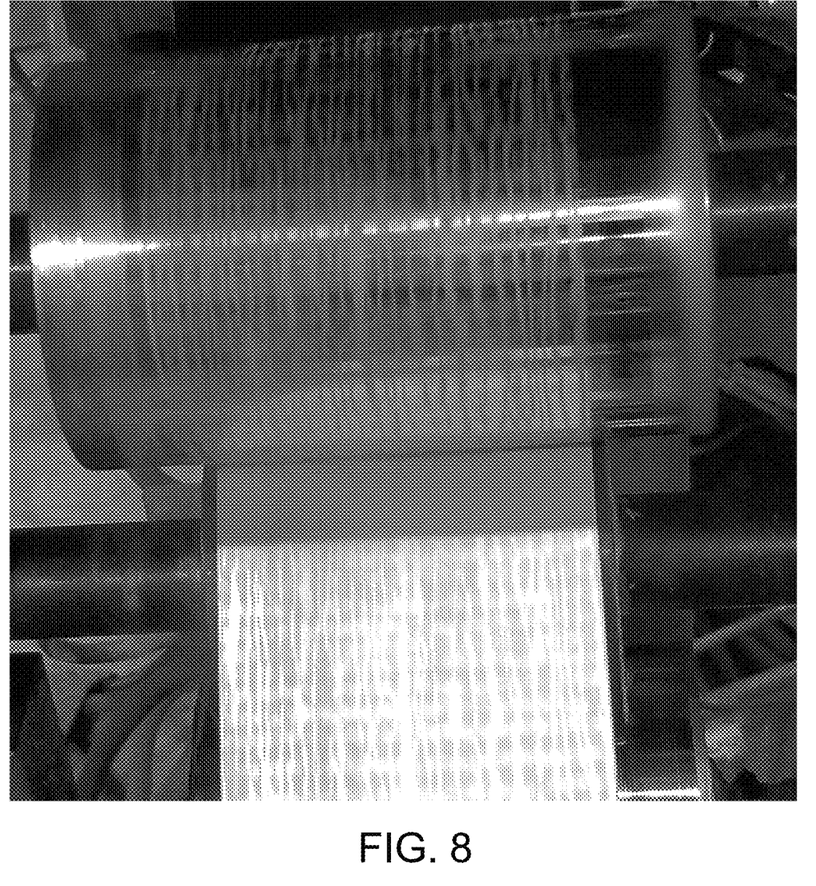
FIG. 8 is an image of an example direct printing cylinder applying the ink onto a PVC slat.
Figure 9:
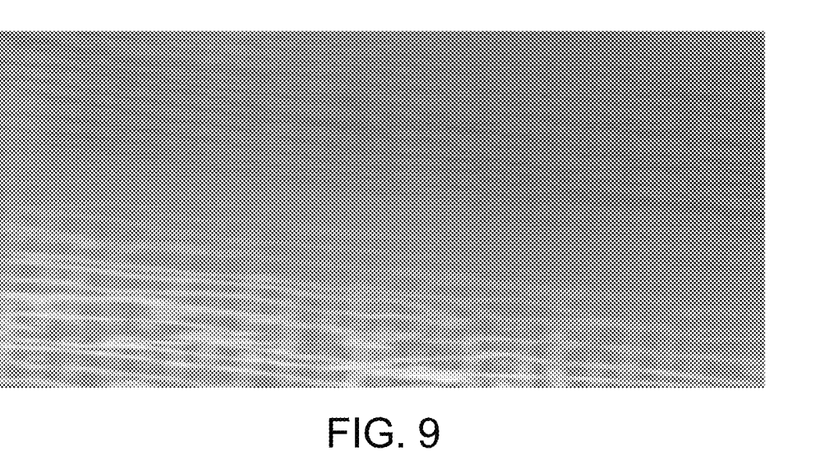
FIG. 9 is an image of a surface of a PCT slat that has been printed and texturized.

FIGS. 6 and 7 show an example of a printing cylinder with a certain pattern of cells that receive ink and then directly print the ink onto a warm slat. FIG. 8 shows an example setup that includes a printing cylinder, an opposed roller and a warm extruded slat passing in between so that the slat receives printing from the cylinder. FIG. 9 is a close-up view of a printed surface of the slat. Ink formulations used in such examples are water based.

It is also noted that the printed PVC slats can be made for end use as vertical or horizontal slat applications. Typically, the slats can be between 2" wide and 5" wide; however, they could be of any other narrower or wider width. Slat thicknesses can vary between 0.018" and 0.045", although they could be thinner or thicker. When used as horizontal or vertical slats in window openings, for example, the slats can be between 2" and 5" wide as well as between 0.018" and 0.045 thick, and they can be cut down to any desired length to fit the opening to be covered.

The invention has been described in an illustrative manner, and it is to be understood that the terminology, which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed:

1. A process for direct printing of a decorative pattern onto an extruded PVC slat, comprising:
   providing an a extruded PVC slat;
   directly contacting a surface of the extruded PVC slat having a temperature above 300° F. with a direct printing cylinder as the slat is moved in a downstream direction, the direct printing cylinder having a cylindrical surface comprising a pattern with a cell structure composed of cavities in the cylindrical surface that receives ink and rotates to directly apply the ink in the form of the pattern onto the surface of the extruded PVC slat;
   controlling a temperature of the direct printing cylinder to inhibit drying of the ink while present on the direct printing cylinder;
   transporting the extruded PVC slat away from the direct printing cylinder; and then
   subjecting the extruded PVC slat to curing downstream of the direct printing cylinder in order to cure the ink onto the surface of the extruded PVC slat to produce a printed slat product.

2. The process of claim 1, wherein controlling a temperature of the direct printing cylinder comprises cooling of the direct printing cylinder, wherein the cooling comprises feeding a cooling fluid into a bore within the cylinder to remove heat therefrom and producing a heated cooling fluid.

3. The process of claim 2, wherein the heated cooling fluid is withdrawn from the direct printing cylinder and is cooled in order to regenerate the cooling fluid for recirculation back into the direct printing cylinder.

4. The process of claim 3, wherein the cooling fluid is cooled to a temperature below 80° F. before cooling the direct printing cylinder.

5. The process of claim 4, wherein the extruded PVC slat is at a temperature between 310° F. and 370° F. while contacting the direct printing cylinder.

6. The process of claim 2, wherein the cooling fluid is cooled to a temperature between 50° F. and 60° F. before cooling the direct printing cylinder.

7. The process of claim 6, wherein the extruded PVC slat is at a temperature between 320° F. and 365° F. while contacting the direct printing cylinder.

8. The process of claim 1, further comprising measuring a temperature of the direct printing cylinder and/or of the extruded PVC slat, and based on the measured temperature controlling the cooling of the direct printing cylinder.

9. The process of claim 1, wherein multiple direct printing cylinders are arranged in series along a first side of the extruded PVC slat in order to provide multiple direct printed patterns thereon.

10. The process of claim 1, wherein at least one additional direct printing cylinder is provided on an opposed side of the extruded PVC slat to provide a directly printed pattern onto the opposed side thereof.

11. The process of claim 1, wherein the extruded PVC slat is at a temperature between 300° F. and 375° F. while contacting the direct printing cylinder.

12. The process of claim 1, further comprising applying the ink onto the direct printing cylinder by passing the direct printing cylinder into an ink pan and then scraping off excess ink using a doctor blade.

13. The process of claim 1, wherein a plurality of printing stations is provided, each printing station comprising one of the direct printing cylinder that directly prints onto the extruded PVC slat, and wherein each printing station is spaced apart from an adjacent printing station to allow ink applied at the previous printing station to dry prior to the subsequent printing station, and wherein each printing station is at least 24 inches away from the previous printing station.

14. The process of claim 1, further comprising texturizing the printed PVC slat, and wherein the texturizing is performed while the printed PVC slat is at a temperature of 200° F. to 250° F.

15. The process of claim 1, wherein after applying the ink into the extruded PVC slat, the printed PVC slat is subjected to drying.

16. The process of claim 15, wherein the drying comprises directing air at the printed PVC slat provided via high velocity air nozzle dryers that are provided within a hood that is heated.

17. The process of claim 16, further comprising cutting the printed slat product to produce louvers for horizontal or vertical applications.

18. The process of claim 1, wherein the curing of the ink is performed by passing the extruded PVC slat through an oven.

19. A process for direct printing of a decorative pattern onto an extruded polymer slat, comprising:
providing an extruded slat;
feeding the extruded slat to a direct printing cylinder having a cylindrical surface and cavities provided in the cylindrical surface defining a pattern with a cell structure;
providing ink within the cell structure to provide an ink-laden cylinder;
directly contacting a surface of the extruded slat with the ink-laden cylinder as the extruded slat is moved in a downstream direction and while the extruded slat is at a temperature between 320° F. and 365° F., the ink-laden cylinder rotating to directly apply the ink in the form of the pattern onto the surface of the extruded slat;
contacting the direct printing cylinder with a cooling fluid to maintain a temperature of the direct printing cylinder to inhibit drying of the ink while present on the direct printing cylinder;
transporting the extruded slat away from the direct printing cylinder; and then subjecting the extruded slat to curing downstream of the direct printing cylinder in order to cure the ink onto the surface of the extruded slat to produce a printed slat product.

20. The process of claim 19, wherein the printed slat product is between 2 inches and 5 inches wide and 0.018 inches and 0.045 inches thick, and comprises a polyvinyl chloride (PVC) core with a printed surface that comprises cured ink provided in a decorative pattern.

21. A system for direct printing of a decorative pattern onto an extruded PVC slat, comprising:
a feed assembly for feeding PVC beads;
an extruder having an inlet for receiving the PVC beads from the feed assembly, a main section for melting the beads, and an outlet for extruding a PVC slat; a printing station comprising:
a frame;
a direct printing cylinder mounted to the frame and comprising a cylindrical surface and cavities provided in the cylindrical surface defining a pattern with a cell structure, and being configured and positioned such that the cylindrical surface rotates and directly contacts the PVC slat moving in a downstream direction while at a temperature of at least 300° F.;
an ink supply assembly containing ink and configured such that the direct printing cylinder receives ink therefrom for direct application to the PVC slat;
a cooling system coupled to the direct printing cylinder for removing heat from the same; and
a curing station located downstream in spaced apart relation with respect to the printing station and configured to cure the ink onto the surface of the PVC slat.

* * * * *